UNITED STATES PATENT OFFICE 2,389,807

STABILIZING ORGANO-SILOXANES

Rob Roy McGregor, Verona, and Earl Leathen Warrick, Pittsburgh, Pa., assignors to Corning Glass Works, Corning, N. Y., a corporation of New York No Drawing. Application June 22, 1944, Serial No. 541,672

6 Claims. (Cl. 260—607)

This invention relates to organo-siloxanes and particularly to the stabilization thereof.

Organo-siloxanes are compositions comprising essentially silicon atoms connected to each other by oxygen atoms through silicon-oxygen linkages, thus

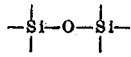

and organic radicals attached through carbon-silicon linkages to at least some of the silicon atoms. They may be prepared by the hydrolysis of a hydrolyzable organo-mono-silane followed by condensation (partial or complete) of the hydrolysis product. They may also be prepared by hydrolyzing and condensing mixtures of different hydrolyzable organo-monosilanes, as described in the copending application of James Franklin Hyde, Serial Number 432,528 filed February 26, 1942, and assigned to the assignee of the present invention. In the latter case, hydrolyzable silanes which contain no organic radicals attached to silicon through carbon-silicon linkages, such as silicon tetrachloride or ethyl orthosilicate, may be included with the organo-silanes, if desired. By employing such mixtures of silanes, it is possible to prepare organo-siloxanes which contain on the average up to and including three organic radicals per silicon atom.

By hydrolyzable organo-monosilanes, we mean derivatives of $SiH_4$, which contain hydrolyzable radicals such as halogens, amino groups, alkoxy, aroxy and acyloxy radicals, etc., and organic radicals that are joined to silicon through carbon-silicon linkages. Examples of such organic radicals are as follows: aliphatic radicals such as methyl, ethyl, propyl, isopropyl, butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc., naphthyl, mono- and poly-alkyl naphthyls as methyl naphthyl, diethyl naphthyls, tri-propyl naphthyl, etc.; tetra-hydro-naphthyl, anthracyl, etc.; aralkyl such as benzyl, phenyl-ethyl, etc.; alkenyl such as methallyl, allyl, etc., and heterocyclic radicals. The above organic radicals may also, if desired, contain inorganic substituents such as halogens, etc.

Hydrolysis of the above silanes or mixtures thereof is generally accompanied by condensation of the intermediately formed hydroxy compounds to form siloxane linkages, thus,

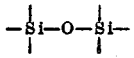

The formation of a siloxane linkage generally results from the close approach of two hydroxyl groups and subsequent elimination of water. It may also result from the close approach of one hydroxyl group to a hydrolyzable group such as halogen, acyloxy, or alkoxy, etc., and subsequent elimination of hydrogen halide, carboxylic acid or alcohol, respectively. Such eliminations are catalyzed by mineral acids, especially hydrochloric and sulphuric, and by alkali metal hydroxides, especially sodium hydroxide. As a result of the hydrolysis and condensation, organo-siloxanes are produced which are partially or completely condensed and which have on the average up to and including three organic radicals attached to each silicon atom. The organo-siloxanes, as previously mentioned, consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals such as halogens, alkoxy, etc. listed above as the hydrolyzable radicals.

The organo-siloxanes so obtained, some of which are liquids, others solids, differ with respect to their resistance to heat. In general, the partially condensed liquid siloxanes undergo a change in physical properties when heated, becoming more viscous, until finally they may become solids. On the other hand, those which are completely condensed, or nearly so (i. e. substantially free of hydroxyl groups) are extremely resistant to further change due to heat alone. However, even the latter may be further polymerized by contact with acidic agents, alkaline agents, or with air, as disclosed in the copending applications of James Franklin Hyde, Serial No. 481,155, filed March 30, 1943; Serial No. 481,154, filed March 30, 1943; and Serial No. 451,354 filed July 17, 1942, all being assigned to the assignee of the present invention.

All the organo-siloxanes, both solid and liquid, undergo a gradual change in properties when exposed to the combined effect of heat and air for a prolonged period of time. This is true even of the completely condensed siloxanes. In the case of the liquid organo-siloxanes, the effect of heat and air is manifested by an increase in viscosity, frequently followed by gelation. This is objectionable where the liquid is being utilized as a hydraulic fluid, dielectric medium and the like. The resinous solid siloxanes, after long exposure to oxygen at elevated temperatures, also undergo a change in properties, becoming less flexible and tough until eventually they reach an extremely brittle stage. Such changes in properties due to heat or to heat and air combined are obviously undesirable.

The primary object of this invention is to stabilize organo-siloxanes.

Another object is to provide a method by which changes of properties of organo-siloxanes due to heat and/or oxygen can be prevented.

Another object is to provide a stabilizer for organo-siloxanes.

We have discovered that the stability of an organo-siloxane may be substantially improved by incorporating therein a minor proportion of an amino compound containing an aliphatic radical attached to the nitrogen through a carbon atom. From 0.05 to 5 per cent, preferably from 0.1 to 1.5 per cent by weight of the stabilizer may be included in the composition to advantage. Although larger amounts of the stabilizer may be used, if desired, little advantage is gained thereby. The so-formed stabilized composition exhibits a marked improvement in resistance to heat and air, and to small quantities of agents which cause polymerization of the siloxanes.

In general we prefer to employ those amino compounds having the general formula

wherein X is an aliphatic radical attached to nitrogen through a carbon atom and Y and Z are radicals selected from the group consisting of hydrogen, aliphatic and aromatic radicals. Among the stabilizers of the class described which may be mentioned are dibutylamine, triamyl amine, ethyl phenyl ethanol amine, butyl diethanolamine, diethanolamine, heptyldiethanolamine, and triethanolamine.

In order to obtain the maximum effectiveness from the above amines it is necessary to react the latter with the organo-siloxane. This may be accomplished by heating the liquid organo-siloxane to which a small amount of the amine has been added to elevated temperature. The most effective temperature for reaction to take place depends, as will be readily appreciated, upon the compositions, siloxane and amine, involved. However, the reaction may be effected at a lower temperature but the time required for completion is longer. In general the solution becomes colored when the reaction is complete.

The effectiveness of the aliphatic amines of our invention in stabilizing the organo-siloxanes may be demonstrated by comparing the change in viscosity over a period of time at 250° C. in air of an organo-siloxane to which no stabilizer has been added with an organo-siloxane to which a stabilizer has been added. By way of illustration, samples of a liquid dimethyl silicone (prepared by the acid catalyzed hydrolysis of dimethyldiethoxysilane and having a viscosity of 488 centistokes at 250° C.) were treated with 1% by weight of a number of different stabilizers of the class described. The treatment consisted in adding the stabilizer to the liquid dimethyl silicone and heating the mixture in air at 250° C. In each case, viscosity was plotted against time in hours until the smooth polymerization curve thus obtained made a sharp break upward indicating incipient gelation. The following table tabulates the results obtained for two of the amines employed along with those obtained in the case of an unstabilized sample. In the column under the heading "Incipient gelation" are given the hours required to reach the point where the polymerization curve broke sharply upward. In the column under the heading "Slope" are given the values obtained by dividing the total per cent viscosity increase by the time in hours at 250° C. required to reach the point of "incipient gelation." These "slope" values correspond to the average increase in viscosity per hour.

Table I

| Stabilizer | Incipient gelation | Slope |
| --- | --- | --- |
| None | 5 | 45.0 |
| Ethyl phenyl ethanolamine | 16 | 17.4 |
| Triamyl amine | 8 | 26.0 |

It will be apparent from the above table that the use of the stabilizers lengthens the time required to reach gelation and also reduces the viscosity increase per hour, i. e. the slope of the polymerization curve.

In general the effectiveness of the stabilizer appears to be directly proportional to the concentration of the stabilizer which has reacted with the siloxane. Accordingly it is clear that there is an upper limit of effective stabilizer concentration for a given stabilizer. However, under certain conditions of use, a siloxane may undergo a change which permits more stabilizer to react with it and in such cases it may be desirable to have excess stabilizer present or to add more periodically to the liquid. The latter method is preferable where the liquid is being used at a sufficiently high temperature to cause sublimation or vaporization of the stabilizer.

We have found that the aliphatic amines are not only effective in stabilizing the partially condensed siloxanes, but also the completely condensed siloxanes. These completely condensed siloxanes are ordinarily quite stable substances but they undergo oxidation and possibly rearrangement in the presence of oxygen at elevated temperatures, whereby the use of stabilizers becomes important. However, the use of the stabilizer is particularly advantageous in the case of liquid organo-siloxanes having on the average from approximately one to approximately two monovalent organic radicals attached to each silicon atom, at least some of the radicals being alkyl radicals, since these siloxanes are particularly sensitive to heat and air at elevated temperatures. Examples of these are ethyl siloxanes, propyl siloxanes, amyl siloxanes, etc., and the aryl alkyl siloxanes such as phenyl methyl siloxanes, phenyl ethyl siloxanes, etc.

In general, organo-siloxanes treated in accordance with our invention are more resistant to change in physical properties under the influence of heat and air. Specifically, the liquid organo-siloxanes are thereby rendered more resistant to increase in viscosity or polymerization due to the effects of heat, the action of oxygen, or catalysts in general. Because of their low pour points, small change of viscosity with temperature and inertness to rubber, they are useful as hydraulic fluids for the transmission of pressure, and also as damping media for delicate instruments and recoil mechanisms or shock absorbing devices. The resinous solid organo-siloxanes when stabilized in accordance with our invention retain their flexibility and toughness for a greater length of time, and are thereby rendered more useful as electrically insulating coatings for metallic conductors, etc.

We claim:

1. The method of stabilizing an organo-siloxane which comprises incorporating therein stabilizing amounts of an aliphatic amine selected from the class consisting of triamyl amine and ethyl phenyl ethanolamine, the organic substituents of said siloxane consisting essentially of monovalent hydrocarbon radicals attached to silicon through carbon-silicon linkages.

2. A composition of matter comprising an organo-siloxane and a minor proportion of an aliphatic amine selected from the class consisting of triamyl amine and ethyl phenyl ethanolamine, the organic substituents of said siloxane consisting essentially of monovalent hydrocarbon radicals attached to silicon through carbon-silicon linkages.

3. A composition of matter comprising a liquid polymeric organo-siloxane and a minor proportion of an aliphatic amine selected from the class consisting of triamyl amine and ethyl phenyl ethanolamine, said organo-siloxane having on the average from approximately one to approximately two monovalent hydrocarbon radicals attached to each silicon atom through carbon-silicon linkages, at least some of said hydrocarbon radicals being alkyl radicals.

4. A composition of matter comprising a liquid organo-siloxane comprising essentially structural units of the formula $(CH_3)_2SiO$ and a minor proportion of an aliphatic amine selected from the class consisting of triamyl amine and ethyl phenyl ethanolamine.

5. A composition of matter comprising a liquid methyl siloxane comprising essentially structural units of the formula $(CH_3)_2SiO$ and a minor proportion of triamyl amine.

6. A composition of matter comprising a liquid methyl siloxane comprising essentially structural units of the formula $(CH_3)_2SiO$ and a minor proportion of ethyl phenyl ethanolamine.

ROB ROY McGREGOR.
EARL LEATHEN WARRICK.